United States Patent
Poncet et al.

(10) Patent No.: US 9,279,072 B2
(45) Date of Patent: Mar. 8, 2016

(54) POLYURETHANE ADHESIVE HAVING LOW GROSS HEAT OF COMBUSTION AND INSULATION PANELS ASSEMBLED WITH SUCH ADHESIVES

(75) Inventors: Philippe Poncet, Rhinau (FR); Jorge Jimenez, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 316 days.

(21) Appl. No.: 13/990,738

(22) PCT Filed: Dec. 15, 2011

(86) PCT No.: PCT/US2011/065023
§ 371 (c)(1),
(2), (4) Date: Mar. 7, 2014

(87) PCT Pub. No.: WO2012/091927
PCT Pub. Date: Jul. 5, 2012

(65) Prior Publication Data
US 2014/0329084 A1    Nov. 6, 2014

Related U.S. Application Data

(60) Provisional application No. 61/427,193, filed on Dec. 26, 2010.

(51) Int. Cl.
| | | |
|---|---|---|
| C09J 175/06 | (2006.01) | |
| C09J 175/08 | (2006.01) | |
| B32B 7/12 | (2006.01) | |
| B32B 15/095 | (2006.01) | |
| C08G 18/30 | (2006.01) | |
| C08G 18/40 | (2006.01) | |
| C08G 18/42 | (2006.01) | |
| C08G 18/48 | (2006.01) | |
| C08G 18/76 | (2006.01) | |
| C09J 167/02 | (2006.01) | |
| E04B 1/76 | (2006.01) | |
| C08K 3/00 | (2006.01) | |
| C08K 3/26 | (2006.01) | |

(52) U.S. Cl.
CPC ............ *C09J 175/08* (2013.01); *C08G 18/302* (2013.01); *C08G 18/4018* (2013.01); *C08G 18/4252* (2013.01); *C08G 18/4829* (2013.01); *C08G 18/7664* (2013.01); *C09J 167/025* (2013.01); *E04B 1/7666* (2013.01); *C08K 3/0033* (2013.01); *C08K 3/26* (2013.01); *Y10T 428/273* (2015.01); *Y10T 428/31598* (2015.04)

(58) Field of Classification Search
CPC ............. C08G 18/302; C08G 18/4018; C08G 18/4252; C08G 18/4829; C08G 18/7664; C08K 3/033; C08K 3/26; C08L 75/06; C08L 75/08; C09J 175/06; C09J 175/08; C09J 167/025; E04B 1/7666; Y10T 428/273; Y10T 428/31598; Y10T 428/31605; Y10T 428/31609
USPC ................................ 428/341, 425.5; 524/425
See application file for complete search history.

(56) References Cited

U.S. PATENT DOCUMENTS

| | | | |
|---|---|---|---|
| 5,262,217 A | 11/1993 | Blaauw | |
| 2005/0080218 A1 | 4/2005 | Thiele | |
| 2006/0228522 A1 | 10/2006 | Dupouy | |
| 2008/0139685 A1* | 6/2008 | Reese et al. | 521/174 |
| 2009/0035506 A1 | 2/2009 | Pind | |
| 2009/0165948 A1* | 7/2009 | Tsuge et al. | 156/327 |

FOREIGN PATENT DOCUMENTS

| | | | | |
|---|---|---|---|---|
| DE | 2002249 A | * | 4/1983 | ............. C08L 75/04 |
| DE | 199 45 831 A | | 3/2001 | |
| DE | 10 2008 025005 A | | 11/2009 | |
| EP | 1997616 A | | 3/2008 | |
| WO | 03/051954 A | | 6/2003 | |
| WO | WO 2010015642 A1 | * | 2/2010 | ............. C08G 18/42 |

* cited by examiner

*Primary Examiner* — Thao T Tran
(74) *Attorney, Agent, or Firm* — Gary C Cohn PLLC

(57) ABSTRACT

A polyurethane adhesive having a low gross heat of combustion is used to assemble insulation panels such as mineral wool insulation panels. The polyurethane adhesive contains a polyisocyanate side and a polyol side. The polyol side includes a certain polyether ether polyol and an aromatic polyester diol. The mixture of these polyols provides excellent adhesion together with suitably low viscosities, even at high filler levels, and a cured adhesive that has a low gross heat of combustion.

3 Claims, No Drawings

POLYURETHANE ADHESIVE HAVING LOW GROSS HEAT OF COMBUSTION AND INSULATION PANELS ASSEMBLED WITH SUCH ADHESIVES

This application claims priority from U.S. Provisional Patent Application No. 61/427,193, filed 26 Dec. 2010.

This invention relates to polyurethane adhesives that have low gross heat of combustion, and to laminates such as insulation panels that are assembled with such adhesives.

Insulation panels are widely used to provide thermal insulation to homes, buildings, cold-storage facilities, ships and other constructions. One class of insulating panels is ceramic fiber insulation panels. These panels contain a layer of a fibrous ceramic, such as fiber glass, mineral wool and the like, which is bonded to facing layers on one or both sides. The fibrous ceramic layer is often bonded to the facing layer through a polyurethane adhesive that contains a mineral particulate filler. Examples of such polyurethane adhesives are described in US Published Patent Application No. 2005-0080218. These adhesives are generally two-part adhesive systems that include a polyisocyanate component and a polyol component. Commercially successful formulations have been based on castor oil. Adhesives based on castor oil tend to have very good adhesive properties.

Because fire safety is an important concern, many jurisdictions have promulgated standards relating to the fire performance of the panels. One such standard is the Euroclass A2 standard. This standard places a limit on the gross heat of combustion for certain construction materials and for their constituent components. Adhesive layers used in those construction materials must exhibit a heat of combustion (measured according to EN ISO 1716) of no greater than 4.0 megajoules/m$^2$.

This restriction places a practical limit on the thickness of the adhesive layer(s) that can be applied. Castor oil-based adhesives tend to have heats of combustion somewhat higher than wanted. If the heat of combustion of the adhesive becomes too high, only a very thin layer of adhesive can be applied, which may be inadequate to provide the necessary bonding. Very thin layers are also more difficult to apply and to gauge accurately. Therefore, from the perspective of manufacturing and product strength, it is desirable that the adhesive layer be thick enough that the product can be manufactured easily and that good bonding is achieved between the fibrous layer and the facing(s). To achieve this, the heat of combustion per unit weight of the adhesive should be as low as possible, while retaining adequate bond strength and processability in a manufacturing setting.

The main processing constraint is the viscosity of the reactive components that form the polyurethane adhesive. The viscosity of the polyol component is usually of most concern, especially when, as is usually the case, it contains the filler particles. If these viscosities become too high, the pumping, mixing and dispensing equipment used to apply the adhesive cannot handle the components easily. This leads to poor or inconsistent mixing and gauging, which in turn leads to product inconsistencies and high reject rates. Therefore, changes that are made to the adhesive system to reduce its gross heat of combustion cannot lead to large increases in viscosity.

One way to reduce viscosity is through the particle size of the filler. Larger filler particles tend to reduce the adhesive viscosity. However, this approach is limited by the greater tendency of larger filler particles to settle out of the adhesive (or its components) and to clog the mixing and dispensing equipment.

Another approach to reducing viscosity is to include a diluent or solvent in the adhesive formulation. This approach is not favored because these diluents or solvents are often somewhat volatile under the manufacturing conditions, and therefore can lead to problems of odor or worker exposure.

What is desired is a polyurethane adhesive which has a low gross heat of combustion, which is prepared from low viscosity components, and which forms a strong bond between the fibrous ceramic layer and the facing layer. The polyurethane adhesive preferably contains little or no diluent or solvent.

This invention is a two-part polyurethane adhesive system comprising
A) a polyisocyanate component that includes an aromatic polyisocyanate and
B) a polyol component including B-1) from 20 to 75% by weight, based on the combined weights of components B-1) and B-2), of a polyether polyol or polyether polyol mixture, which polyether or polyether polyol mixture has an average of from 2 to 4 hydroxyl groups per molecule and a viscosity of up to 500 mPa·s at 25° C., B-2) from 25 to 80% by weight, based on the combined weights of components B-1) and B-2), of an aromatic polyester diol, B-3) from 0.1 to 3% by weight water, and B-4) from 0 to 15% by weight of isocyanate-reactive components other than components B-1), B-2) and B-3), further provided that
(i) component A), component B) or both contains at least one catalyst for the reaction of isocyanate groups with hydroxyl group;
(ii) the aromatic polyester diol is a reaction product of an aromatic dicarboxylic acid, aromatic dicarboxylic halide or aromatic dicarboxylic acid anhydride with diethylene glycol and a poly(ethylene glycol), has a hydroxyl equivalent weight of from about 150 to about 250 and has a viscosity of no greater than 2000 mPa·s at 25° C.; and
(iii) component A), component B) or both may contain a particulate mineral filler, in an amount up to 65% of the combined weight of components A) and B).

A cured adhesive made by mixing and curing the components of this two-part adhesive composition has a low gross heat of combustion. An unfilled adhesive (i.e., one containing no particulate mineral filler) may have a gross heat of combustion of no greater than 30 megajoules (MJoules) per kilogram and more typically no greater than 28 MJoules per kilogram. For purposes of this invention, gross heat of combustion is measured in a bomb calorimeter according to EN ISO 1716, or equivalent method. Filled adhesives according to the invention have significantly lower gross heats of combustion. At filler levels of up to about 25-40% by weight, the cured adhesive frequently has a gross heat of combustion of 22 MJoules per kilogram or less and often less than 18 MJoules per kilogram or evn less than 17 MJoules per kilogram. At higher filler levels, even lower gross heats of combustion can be achieved. When filler levels approach 50-65% by weight, the gross heat of combustion of the filler may be 15 MJoules per kilogram or even less.

The Brookfield viscosity of each of components A) and B) are generally no greater than 40,000 mPa·s at 20° C., even in the absence of a diluent or solvent. Typically, the filler is incorporated into the polyol component B), and as a result the viscosities of the polyol component B) are typically much higher than those of the polyisocyanate component A). When the polyol component contains in the range of from 40-55% by weight of the filler particles, the viscosity is typically 20,000 mPa·s or less. When the polyol component contains greater quantities of the filler particles, such as from 55-65% by weight filler, the viscosity tends to be in the range of 20,000 to 35,000 mPa·s.

Adhesive properties of the cured are closely comparable to commercially available castor oil-based adhesive systems (at comparable filler levels) that have significantly higher gross heats of combustion. The adhesive of the invention tends to fail in a fiber tear mode, rather than via cohesive failure (i.e., breakage within the adhesive layer) or via adhesive failure (i.e., delamination from the facing layer).

In another aspect, this invention is a laminate comprising a fibrous ceramic layer, a facing layer, and an adhesive layer interposed between the fibrous ceramic layer and the facing layer and forming an adhesive bond between the fibrous ceramic and facing layers, wherein the adhesive layer is a cured polyurethane prepared by mixing the polyisocyanate component A) and polyol component B) of the two-part adhesive system of the invention, applying the resulting mixture between the fibrous ceramic layer and the facing layer, and curing the mixture.

Because of the low gross heat of combustion of the cured adhesive, thicker layers of the adhesive can be applied while staying within the strictures of standards such as Euroclass A2, which sets upper limits on heat of combustion per unit of surface area. The ability to use thicker adhesive layers leads to easier processing and better bonding between layers of insulating panels.

The polyisocyanate component A) of the adhesive system includes at least one aromatic polyisocyanate. Examples of aromatic polyisocyanates include toluene-2,4-diisocyanate, toluene 2,6-diisocyanate or mixtures thereof, 2,4'-methane diphenyldiisocyanate, 4,4'-methane diphenyldiisocyanate, polymethylene polyphenylisocyanates and the like. Any of the foregoing may be modified with allophonate, carbodiimide, uretonimine, urethane, urea or biuret linkages. A preferred polyisocyanate is a polymeric MDI. By "polymeric MDI", it is meant a mixture of MDI with polymethylene polyphenylisocyanates that contain at least three phenylisocyanate groups. The aromatic polyisocyanate or mixture thereof contained in polyisocyanate component A) suitably contains from 2 to 3.5, more preferably from 2.2 to 3.2 isocyanate groups per molecule and has an equivalent weight per isocyanate group of from 125 to 250, preferably from 125 to 140. The aromatic polyisocyanate or mixture thereof preferably has a viscosity of no greater than 500 mPa·s at 25° C., and more preferably has a viscosity of no greater than 200 mPa·s at 25° C. These viscosities, like all others mentioned herein, are Brookfield viscosities at the stated temperature.

The aromatic polyisocyanate(s) may be the sole component of polyisocyanate component (A). Other components that may be present in polyisocyanate component (A) include one or more catalysts, particulate fillers or other optional additives that are not reactive with isocyanate groups, as described more fully below.

The polyol component B) includes a polyether polyol or polyether polyol mixture (B-1), which polyether or polyether polyol mixture has an average of from 2 to 4 hydroxyl groups per molecule and a viscosity of up to 500 mPa·s at 25° C. The polyether polyol or mixture preferably contains one or more poly(propylene oxide) polymers or copolymers of from 70 to 99.5% by weight propylene oxide and from 0.5 to 30% ethylene oxide. Such a copolymer may be a random or block copolymer. If a block copolymer, the ethylene oxide is preferably polymerized onto the chain ends to introduce primary hydroxyl groups. The polyether polyol or mixture preferably has an average molecular weight of from about 800 to 1500 and more preferably from 800 to 1200. It preferably contains an average of 2 to 3, more preferably 2.5 to 3, hydroxyl groups per molecule.

The polyol component B) also includes an aromatic polyester diol (B-2). This polyester diol is a reaction product of an aromatic dicarboxylic acid, aromatic dicarboxylic halide or aromatic dicarboxylic acid anhydride with diethylene glycol and a poly(ethylene glycol). The reaction may be conducted in multiple steps and may involve the formation of one or more cyclic intermediates. The aromatic dicarboxylic acid is preferably phthalic acid (or halide or anhydride thereof) or terephthalic acid (or halide or anhydride thereof) with diethylene glycol and a poly(ethylene glycol). The aromatic content of this polyol is preferably from about 10 to 25%, more preferably from 12 to 20% and still more preferably from 14 to 18%. The aromatic content is the proportion of the weight of the aromatic polyester polyol that is made up of aromatic rings (including ring hydrogens). The aromatic polyester diol has a hydroxyl equivalent weight of from about 150 to about 250, preferably from about 160 to 240 and more preferably from 160 to 220. Its viscosity is preferably no greater than 1200 mPa·s at 25° C. and more preferably no greater than 1000 mPa·s.

Components B-1 and B-2 are present in a weight ratio of from 20:80 to 75:25. A preferred ratio of component B-1 to B-2 is from 30:70 to 45:55.

The particulate mineral filler may be, for example, any of various types of clay, calcium carbonate, calcium oxide, talc, titanium dioxide, iron oxide, magnesium hydroxide, aluminum hydroxide, carbon black, graphite and the like, or a ceramic material such as glass, boron nitride, silicon nitride, aluminum nitride, silicon carbide, boron carbide, aluminum carbide and the like.

The average particle size (d (50%)) of the particulate mineral filler is preferably in the range of from 0.5 to 50 microns, more preferably from 0.75 to 10 microns and still more preferably from 1 to 5 microns. The particulate mineral filler preferably constitutes from 30 to 45% by weight of the entire adhesive. Increasing amounts of particulate mineral filler provide the advantage of reducing the gross heat of combustion of the adhesive, but also increase the viscosity of the polyol component and can reduce the strength of the adhesive bonds that form.

Water (component B-3) is present in polyol component B) to generate a gas upon reaction with the polyisocyanate and expand the composition slightly as it cures. This enables the curing adhesive to better penetrate between the fibers of a fibrous ceramic material and form a strong bond thereto. A preferred amount of water is from 0.15 to 1.0% by weight and a more preferred amount is from 0.2 to 0.8% by weight.

The polyol component B may contain other isocyanate-reactive materials (component B-4) in addition to those already described. However, if those material are present, they should be present in small amounts, such as no greater than 15% of the combined weight of components B-1, B-2, B-3 and B-4. Component B-4, if present, may constitute up to 6% or up to 3% of the combined weight of components B-1, B-2, B-3 and B-4. Polyol component B is preferably devoid of component B-4 materials.

A catalyst for the reaction of isocyanate groups with hydroxyl groups (including water) is present in the polyisocyanate component A), the polyol component B) or both. The catalyst is preferably included in the polyol component B). Suitable catalysts include tertiary amine compounds and organometallic compounds, especially tin carboxyates and tetravalent tin compounds. Representative tertiary amine catalysts include trimethylamine, triethylamine, dimethyl-ethanolamine, N-methylmorpholine, N-ethylmorpholine, N,N-dimethylbenzylamine, N,N-dimethylethanolamine, N,N,N',N'-tetramethyl-1,4-butanediamine, N,N-dimethylpiperazine, 1,4-diazobicyclo-2,2,2-octane, bis(dimethylaminoethyl)ether, bis(2-dimethylaminoethyl) ether, morpholine,4,4'-(oxydi-2,1-ethanediyl)bis, triethylenediamine, pentamethyl diethylene triamine, dimethyl cyclohexyl amine, N-cetyl N,N-dimethyl amine, N-coco-morpholine, N,N-dimethyl aminomethyl N-methyl ethanol amine, N,N,N'-trimethyl-N'-hydroxyethyl bis(aminoethyl) ether, N,N-bis(3-dimethylaminopropyl)N-isopropanolamine, (N,N-dimethyl)amino-ethoxy ethanol, N,N,N',N'-tetramethyl hexane diamine, 1,8-diazabicyclo-5,4,0-undecene-7, N,N-dimorpholinodiethyl ether, N-methyl imidazole, dimethyl aminopropyl dipropanolamine, bis(dimethylaminopropyl)amino-2-propanol, tetramethylamino bis(propylamine), (dimethyl (aminoethoxyethyl))((dimethyl amine)ethyl)ether, tris(dimethylamino propyl)amine, dicyclohexyl methyl amine, bis(N,N-dimethyl-3-aminopropyl)amine, 1,2-ethylene piperidine and methyl-hydroxyethyl piperazine. Examples of useful tin catalysts include stannous octoate, dibutyl tin diacetate, dibutyl tin dilaurate, dibutyl tin dimercaptide, dialkyl tin dialkylmercapto acids, dibutyl tin oxide, dimethyl tin dimercaptide, dimethyl tin diisooctylmercaptoacetate, and the like.

The polyisocyanate and/or polyol components of the adhesive composition may contain other, optional components such as surfactants, wetting agents, colorants, biocides, preservatives and the like. Any or all of these can be omitted. The adhesive composition preferably contains at most small amounts (no more than 5% by weight, preferably no more than 2% by weight, still more preferably no more 0.5% by weight) of non-reactive organic compounds having a molecular weight of less than 1000. By "non-reactive" it is meant that materials that do not react with either hydroxyl or isocyanate groups under the conditions of the curing reaction.

The adhesive composition of the invention is used to bond substrates by mixing the polyol and isocyanate components, applying the mixture between the substrates, and then curing the mixture. Conventional methods for mixing, applying and curing two-part polyurethane adhesives are entirely suitable for use with this invention, and no special apparatus or curing conditions are needed. The adhesive composition will cure at room temperature; however, elevated temperatures may be applied to speed the cure. The polyol and isocyanate components should be mixed at ratios that provide an isocyanate index of from 70 to 200, preferably from 90 to 130 and more preferably from about 100 to 125. Isocyanate index is equal to 100 times the ratio of hydroxyl groups in the polyol component to isocyanate groups in the isocyanate component.

The adhesive composition of the invention is useful in manufacturing insulation panels. These panels are laminates that comprise a fibrous ceramic layer, a facing layer, and an adhesive layer interposed between the fibrous ceramic layer and the facing layer and forming an adhesive bond between them. In most cases, the panels have a sandwich structure in which the fibrous ceramic layer forms a core that is positioned between two facing layers, each of which is affixed to the fibrous ceramic layer through an adhesive layer. A cured adhesive composition according to this invention constitutes the adhesive layer(s) that affix the facing layer(s) to the fibrous ceramic layer.

The fibrous ceramic layer is made up of fibers of an inorganic material. The fibers may be random, matted, woven or otherwise formed into a layer or mat. The fibers can be made of, for example, glass, boron, carbon, asbestos, an aluminosilicate material, or other inorganic material. A preferred fibrous ceramic layer is a layer of so-called mineral wool or stone wool (sometimes also known as slag wool). The fibers may have diameters of from about 0.5 to 50 μm, more preferably from 1 to about 25 μm. A binder may be present to hold the fibers together into a mass. The ceramic fiber layer provides thermal insulation characteristics to an insulation panel by virtue of containing a significant void volume which is normally filled with air but can be filled with other gas. A preferred fibrous ceramic layer has a void volume of at least 50% and at least 90%. The fibrous ceramic layer suitably has a density of from 2 to about 8 pounds per cubic foot (32 to 148 kg/m$^3$).

The thickness of the fibrous ceramic layer is typically from about 6 to 300 mm, more typically from 20 to about 300 mm and still more typically from 100 to 200 mm.

A wide variety of structural, functional or decorative materials can be used as facing layer(s) for an insulation panel. Metals such as steel, galvanized steel, aluminum and the like can be used. Foils, paper, various polymeric materials, wood and other materials are also useful. The facing layers on opposing sides of an insulation panel may be made of different materials.

The low gross heat of combustion of the cured adhesive permits somewhat thicker adhesive layers to be applied in these insulation panels, compared to adhesives that have higher gross heats of combustion. Adhesive layer thickness often can be increased by from 10 to 20% by using the adhesive composition of this invention. An insulation panel carrying up to as much as 220 to 300, preferably from 235 to 260 grams per square meter of a cured adhesive according to the invention often will meet the Euroclass A2 standard for non-flooring construction materials.

Of course, smaller amounts of the adhesive can be used if adequate bonding is obtained, and greater amounts of adhesive can be used if its gross heat of combustion is especially low, or if it is not necessary to meet the Euroclass A2 standard.

The following examples are provided to illustrate the invention but are not intended to limit the scope thereof. All parts and percentages are by weight unless otherwise indicated.

EXAMPLE 1 AND COMPARATIVE SAMPLES A-D

Comparative Sample A is prepared from a polyol component that contains 32% castor oil, 7% of a 450 molecular weight poly(propylene oxide) triol, 5% of a 400 molecular weight poly(propylene oxide) diol, 1% of tripropylene glycol, 1.2% of a tertiary amine catalyst solution (Dabco KTM 60, from Air Products and Chemicals), 53.55 parts of calcium carbonate having an average (d 50%) particle size of 2.7 μm (Millicarb OG, from Omya UK, Ltd.) and 0.25% water. The formulated polyol component has a hydroxyl number of 133 and a viscosity of 3480 mPa·s at 20° C. The polyisocyanate component is a polymeric MDI material having an isocyanate content of 31.1%, an isocyanate functionality of 2.7 and a viscosity of 190 mPa·s.

Portions of the polyol and isocyanate components are mixed at a weight ratio of 100:35 (110 isocyanate index) and cured. Gross heat of combustion of a sample of the cured adhesive is evaluated in a bomb calorimeter in accordance with EN ISO 1716; the gross heat of combustion for the filled adhesive is found to be approximately 18.9 MJoules/kilogram. This correlates to a gross heat of combustion of approximately 31.1 MJoules/kg for the unfilled adhesive.

Example 1 and Comparative Samples B, C and D are made and tested in similar manner. The formulation for each of these is as set forth in Table 1 below. Table 1 also reports the viscosity of the polyol component in each case, and the gross heat of combustion of the cured adhesive, and the gross heat of combustion of the unfilled cured adhesive.

TABLE 1

| | Sample Designation | | | | |
|---|---|---|---|---|---|
| | Comp. A | Comp. B | Comp. C | Ex. 1 | Comp. D |
| Polyol Component | | | | | |
| Castor Oil | 32.0 | 0 | 0 | 0 | 0 |
| 1000 MW poly(propylene oxide) triol | | 30.0 | 20.0 | 20.0 | 20.0 |
| 450 MW poly(propylene oxide) triol | 7.0 | 9.0 | 0 | 0 | 0 |
| 400 MW poly(propylene oxide) diol | 5.0 | 5.0 | 0 | 0 | 0 |
| Branched aromatic polyester polyol[1] | 0 | 0 | 25.0 | 0 | 0 |
| Aromatic polyester diol[2] | 0 | 0 | 0 | 25.00 | 0 |
| Phthalic anhydride/diethylene glycol diol[3] | | 0 | 0 | 0 | 25.00 |
| Tripropylene glycol | 1.0 | 1.0 | 0 | 0 | 0 |
| Catalyst[4] | 1.2 | 1.2 | 1.2 | 1.2 | 1.2 |
| Filler particles[5] | 53.55 | 53.55 | 53.55 | 53.55 | 53.55 |
| Water | 0.25 | 0.25 | 0.25 | 0.25 | 0.25 |
| Equivalent Weight | 133 | 133 | 133 | 143 | 143 |
| Viscosity, mPa · s, 20° C. | 3480 | 6440 | 54,200 | 8300 | 21,000 |
| Adhesive | | | | | |
| Polyol/isocyanate ratio, index | 100/35,110 | 100/35,110 | 100/35,110 | 100/38,110 | 100/38,110 |
| Gross heat of combustion, MJoules/kilogram (filled) | 18.9 | 16.75 | 16.1 | 16.0 | 16.2 |
| Gross heat of combustion, MJoules/kilogram (unfilled) | 31.1 | 27.5 | 26.5 | 26.0 | 26.3 |
| Max. coat weight[6], g/m$^2$ | 212 | 239 | 248 | 250 | 247 |
| % increase in max. coat weight[7] | — | 12.0% | 16.7% | 16.5% | 17% |

[1] A 2.7 functional, 160 equivalent weight aromatic polyester polyol. This polyol has a viscosity of 16,000 mPa · s at 25° C.
[2] A 2.0 functional, 180 equivalent weight aromatic polyester. This polyol is a reaction product of terephthalic acid, diethylene glycol and a poly(ethylene glycol) and has a viscosity of 600 mPa · s at 25° C.
[3] A difunctional phthalic anhydride/diethylene glycol polyester sold by Stepan Company as PS-3152, having a equivalent weight of 178 and a viscosity of 2700 mPa · s at 25° C.
[4] Dabco KTM60 catalyst, from Air Products and Chemicals.
[5] Millcarb OG calcium carbonate particles, from Omya UK, Ltd.
[6] The maximum coating weight of cured adhesive which will produce a gross heat of combustion of 4.0 MJoules/m$^2$ (Euroclass standard A2).
[7] The increase in thickness of the maximum coating weight which will produce a gross heat of combustion of 4.0 MJoules/m$^2$, compared to Comparative Sample A.

As can be seen from the data in Table 1, the substitution of polyether polyols and polyester polyols for castor oil results in a very significant decrease in the gross heat of combustion of the adhesive. In addition, the viscosity of the formulated polyol components varies very substantially depending on the selection of the constituent polyols. The selection of the polyester polyol has a particularly large impact on the viscosity of the polyol component. The viscosities of the polyol component of Comparative Samples C and D are too high to be easily processed. Based on the combination of low viscosity and low gross heat of combustion, Comparative Sample B and Ex. 1 are taken for adhesion testing, together with Comparative Sample A.

Adhesion testing is performed as follows:

The polyol and isocyanate components are preheated to approximately 40° C. and mixed at a ratio to provide an isocyanate index of 110. The resulting mixture is applied as a bead to a 0.7 mm thick metal sheet (facing layer) and spread with a notched trowel to provide a coating weight of 250 g/m$^2$. A 6 cm×6 cm×4 cm thick block of mineral wool is positioned atop the adhesive layer. A pressure of 100 g/cm$^2$ is applied to the mineral wool, and the adhesive layer is cured at 40-60° C. When the adhesive is cured, the mineral wool layer is manually separated from the facing layer. The mode of adhesive failure is evaluated by visually inspecting the surfaces of the delaminated material. Failure mode is characterized as follows:

Adhesive failure between adhesive and the facing layer (Fail);

Adhesive failure between the adhesive and the mineral wool layer (Fail);

Cohesive failure of the adhesive (the adhesive layer separates) (Fail):

Fiber tear mode (the mineral wool layer separates) (Pass).

The foregoing test is performed under various temperature conditions as follows:

A. Facing layer and adhesive layer both at 20° C.;

B. Facing layer at 38° C., adhesive layer at 20° C.;

C. Facing layer at 20° C., adhesive layer at 38° C.; and

D. Facing and adhesive layers both at 38° C.

Except in cases of failure type 1 (adhesive failure between adhesive and the facing layer), the adhesive bond to the facing layer is evaluated by attempting to separate the adhesive from the facing layer using a blunt tool. Poor adhesion (−) is indicated by peeling of the adhesive on this test; good bonding (+++) is indicated when the adhesive cannot be peeled off in this manner. Intermediate ratings (+, ++) indicate that some incomplete peeling is seen on this test.

Results are as indicated in Table 2.

TABLE 2

| Adhesive/Facing layer temperatures | Comp. Sample A | Comp. Sample B | Example 1 |
|---|---|---|---|
| 20° C./20° C. | | | |
| Cohesion failure mode | Pass | Pass | Pass |
| Adhesion | + | − | + |
| 20° C./38° C. | | | |
| Cohesion failure mode | Pass | Pass | Pass |
| Adhesion | ++ | + | ++ |
| 38° C./20° C. | | | |
| Cohesion failure mode | Pass | Fail | Pass |
| Adhesion | +++ | ND | + |
| 38° C./38° C. | | | |
| Cohesion failure mode | Pass | Fail | Pass |
| Adhesion | +++ | ND | +++ |

ND—not determined due to cohesion mode of failure.

As can be seen from the data in Table 2, Comparative Sample B performs very poorly on the adhesion test, despite having a low viscosity and a low gross heat of combustion. Example 1, on the other hand, performs very similarly to the commercial product (Comparative Sample A), and has the advantage of significantly lower gross heat of combustion.

EXAMPLE 2

An adhesive is prepared from the same polyisocyanate as is described with respect to Example 1, and a polyol component containing:
1000 MW poly(propylene oxide) triol: 14 parts
Aromatic polyester diol (as in Example 1): 19.7 parts
Catalyst (as in Example 1): 0.4 parts
Black paste: 0.1 part
Filler particles (calcium and magnesium carbonate): 65 parts
Water: 0.8 parts This polyol component has a viscosity of 22,800 mPa·s at 25° C. When this polyol component is mixed with the polyisocyanate component at an index of 120 and cured, the cured adhesive has a gross heat of combustion of about 14.4 MJoules/kg. The unfilled adhesive has a gross heat of combustion of about 26.9 MJoules/kg.

What is claimed is:

1. A laminate comprising a fibrous ceramic layer, a facing layer, and an adhesive layer interposed between the fibrous ceramic layer and the facing layer and forming an adhesive bond between the fibrous ceramic and facing layers, wherein the adhesive layer is a cured polyurethane prepared by mixing a polyisocyanate component A) and polyol component B) of a two-part adhesive system, applying the resulting mixture between the fibrous ceramic layer and the facing layer to form a layer of the mixture, and curing the mixture to form an adhesive layer having a weight of 235 to 260 g/m$^2$ and a gross heat of combustion of no greater than 4.0 MJoules/m$^2$, wherein:

the polyisocyanate component A) includes an aromatic polyisocyanate and the polyol component B) includes B-1) from 20 to 75% by weight, based on the combined weights of components B-1) and B-2), of a polyether polyol or polyether polyol mixture, which polyether or polyether polyol mixture has an average of from 2 to 4 hydroxyl groups per molecule and a viscosity of up to 500 mPa·s at 25° C., B-2) from 25 to 80% by weight, based on the combined weights of components B-1) and B-2), of an aromatic polyester diol, B-3) from 0.1 to 3% by weight water, and B-4) from 0 to 15% by weight of isocyanate-reactive components other than components B-1), B-2) and B-3), further provided that (i) component A), component B) or both contains at least one catalyst for the reaction of isocyanate groups with hydroxyl group;

(ii) the aromatic polyester diol is a reaction product of an aromatic dicarboxylic acid, aromatic dicarboxylic halide or aromatic dicarboxylic acid anhydride with diethylene glycol and a poly(ethylene glycol), has a hydroxyl equivalent weight of from about 150 to about 250 and has a viscosity of no greater than 2000 mPa·s at 25° C.; and (iii) component A), component B) or both contain a particulate mineral filler, in an amount of 50 to 65% of the combined weight of components A) and B).

2. The laminate of claim 1, wherein the fibrous ceramic layer is mineral wool.

3. The laminate of claim 2, wherein the facing layer is a metal.

* * * * *